INVENTOR.
FRIEND H. KIERSTEAD JR.
BY

ATTORNEY

Dec. 29, 1964 F. H. KIERSTEAD, JR 3,163,098

VELOCITY-ALTITUDE RATIO COMPUTER AND CAMERA CONTROL APPARATUS

Filed March 8, 1961 4 Sheets-Sheet 2

*INVENTOR.*
FRIEND H. KIERSTEAD JR.
*BY*

ATTORNEY

Dec. 29, 1964 F. H. KIERSTEAD, JR 3,163,098

VELOCITY-ALTITUDE RATIO COMPUTER AND CAMERA CONTROL APPARATUS

Filed March 8, 1961 4 Sheets-Sheet 3

INVENTOR.
FRIEND H. KIERSTEAD JR.

BY

ATTORNEY

INVENTOR.
FRIEND H. KIERSTEAD JR.
BY

ATTORNEY

United States Patent Office 3,163,098

Patented Dec. 29, 1964

3,163,098

VELOCITY-ALTITUDE RATIO COMPUTER AND CAMERA CONTROL APPARATUS

Friend H. Kierstead, Jr., Cuyahoga Falls, Ohio, assignor to Goodyear Aerospace Corporation, a corporation of Delaware Filed Mar. 8, 1961, Ser. No. 94,370
11 Claims. (Cl. 95—12.5)

This invention relates to computers for producing an output voltage which is a function of vehicle velocity divided by vehicle height and is adapted to be used with various vehicles, such as aircraft, satellites, or missiles, and, more particularly, the invention is concerned with using a computed voltage of the character described to control the operation of an aircraft camera in a manner to eliminate negative blurring or distortion due to the forward motion of the vehicle at the time the camera lens is open.

It is possible with the apparatus of the present invention to employ the V/H computer for vehicle guidance purposes, for example to control yaw or side drift. This is accomplished in the apparatus of the invention by comparing stored reference information of the terrain over which the vehicle is moving with constantly obtained reference information of the terrain, and with the cycle of comparison being periodically repeated.

It has been proposed heretofore to provide vehicle guidance apparatus wherein stored reference information is compared with continuously obtained information of the terrain over which a vehicle is passing, and as the vehicle moves over the terrain a portion of the comparison is periodically repeated in what might be called a "leap-frogging" or a "boot-strapping" operation to measure distance flown for guidance purposes. Such a vehicle guidance technique is disclosed and claimed in U.S. patent application Serial No. 757,651, filed August 25, 1958, and entitled "Dead Reckoning Guidance System and Method for Vehicles."

It is also old in the art to provide a guidance system for vehicles homing on a target or landing field wherein an optical picture or a radar image of the target is taken and stored in the vehicle with this information then being compared to a range-corrected continuously taken image or picture of the terrain towards which the vehicle is directed, the comparison resulting in error voltages for returning the vehicle to proper course should the vehicle be off course. Such known apparatus is disclosed in U.S. patent application Serial No. 843,034, filed September 24, 1959, and entitled "Passive Homing Guidance System."

Such known prior art apparatus, however, has not specifically computed a V/H voltage as a result of the matching technique, nor has such prior art provided apparatus in which an aircraft camera can take pictures without blurring even though the aircraft is traveling at high speeds and an extremely wide range of altitudes.

It is the general object of the present invention to provide relatively simple, inexpensive, fully automatic apparatus for continuously computing a velocity divided by height ratio of an aircraft, or other vehicle moving over terrain.

Another object of the invention is to provide apparatus of the character described in conjunction with an aerial camera which is automatically and continuously positioned so that the camera film will look at the same terrain area during the entire time that the camera shutter is open and regardless of the forward movement of the aircraft or its height above the terrain.

It is an object of the invention to provide aerial reconnaissance systems that obtain high-resolution photographs by controlling the continuous operation of the camera in systems for viewing the area of the terrain over which the vehicle passes by means of controlling the film speed at a rate proportional to the ground speed of the vehicle to prevent smearing of the picture detail. By such arrangements of the invention image motion compensation is applied to the most widely employed method of aerial camera operation. The required image motion compensation signal is a measure of the speed of the image in the focal plane, this being proportional to the magnitude of vehicle velocity divided by its altitude above the terrain (V/H). The V/H computer system provides this image motion compensation signal by accurately measuring the speed of the optical image as it is viewed in the vehicle. The V/H computer system of this invention also may be used to measure the drift angle, which is the angle between the true ground track and the camera reference line. The system of this invention will measure the V/H ratio to an accuracy of 99.9 percent or better. The system preferably provides for translation of the objective lens of the sensor of the V/H computer to make possible optical-electronic image tracking and the automatic tracking is accomplished in the matcher or data correlator unit, which uses, or may employ, map-matching techniques.

An additional object of the invention is the provision of a camera control system comprising, a vehicle, control means for controlling the camera, the film, the shutter or any combination thereof, optical means for tracking the camera viewed terrain including means for producing and storing a first electronic image signal of the terrain representative of the area viewed by the camera and for producing additional electronic image signals of the representative area, means for comparing and correlating the said signals and computing a signal representing the V/H ratio thereby and means including the computed ratio signal for the image compensation of said camera by said camera control means.

In keeping with further objects the systems of my invention provide for accurate V/H control over a wide range of conditions relating to altitude, velocity stabilization, target brightness and contrast and environment of pressure, temperature, humidity and vibration. The highly accurate image motion compensating of the invention achieves the computating of the V/H ratio with an error no greater than 0.1 percent and provides for systems capable of operations at all altitudes from 1000 feet to satellite altitudes and well exceeding 1000 miles above the terrain as required in relation to a satellite, aircraft, missile or space craft.

The foregoing objects of the invention and other objects will become apparent as the description proceeds.

For a better understanding of the invention reference should be had to the accompanying drawings wherein FIG. 1 is a diagrammatic perspective view of an aircraft carrying a camera and illustrating the manner of camera motion for one system to automatically hold the camera to view the same terrain regardless of the forward speed of the aircraft or its height above the terrain, and/or for similar control of an image sensor for a V/H computer;

Figure 1:
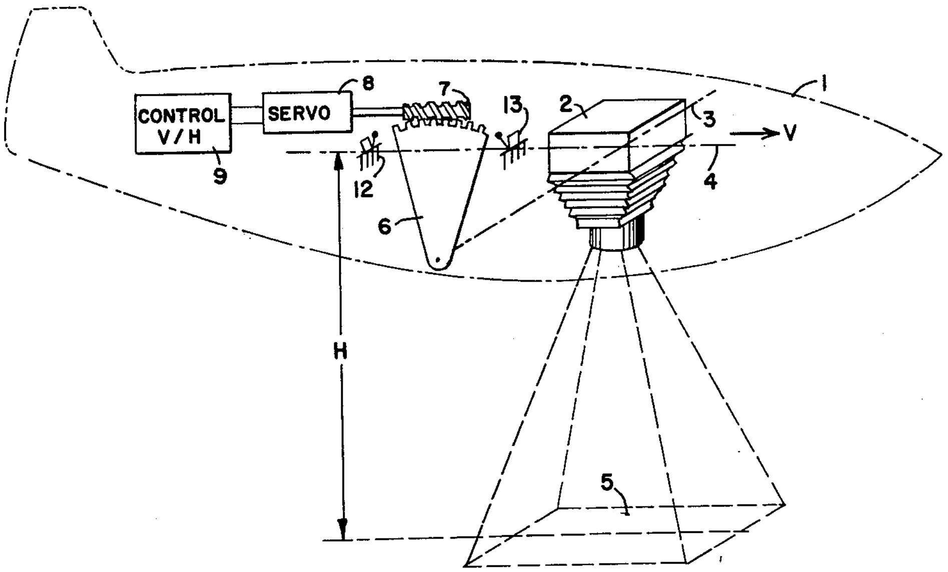

Having more specific reference to the drawings, the numeral 1 indicates diagrammatically an aircraft carrying an aerial camera 2 on a horizontal pivot 3 which extends at right angles to the longitudinal axis 4 of the aircraft 1. The camera 2 normally views an area 5 of the terrain over which the aircraft 1 is passing, and one of the objects of the invention, as aforesaid, is to position the camera 2 so that regardless of the forward velocity V of the aircraft or its height H above the terrain area 5 that the area 5 of the terrain will be continued to be viewed by the camera at least for the time that the shutter of the camera is open.

In order to achieve the desired result stated a worm gear sector 6 is secured to the camera 2 on the camera axis 3 so that arcuate movement of the worm gear sector 6 swings the camera 2 about axis 3. Engaging with the worm gear sector 6 is a worm 7 operated by a servo motor 8 under the operation of a control 9. It is the purpose and function of the control 9 to supply the servo motor 8 with an operating voltage in an amount which is a function of the forward velocity V of the aircraft 1 and its height above the terrain so that the servo motor 8 turns the worm 7 and the worm gear segment 6 to progressively tilt the camera 2 about the axis 3 at such a speed that the camera 2 will continue to look at the terrain area 5 during the movement of the aircraft, for example from point 10 to point 11 of FIG. 2.

Figure 2:
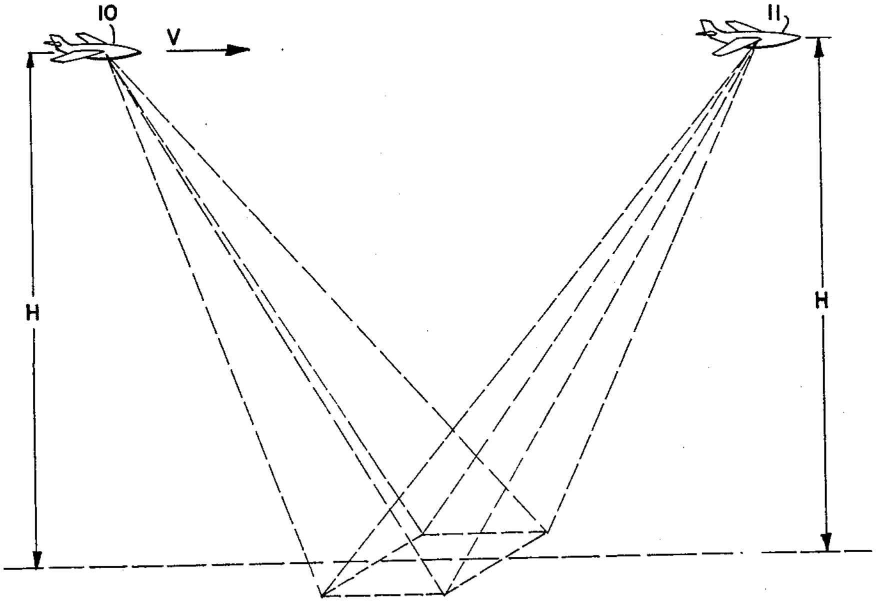
FIG. 2 is a diagrammatic view illustrating how an aircraft camera, or image sensor for a V/H computer, can be positioned to view the same terrain even though the aircraft moves from one point to another during the time that the camera shutter is open.

In the form of the invention shown in FIG. 1, limit switches 12 and 13 may be mounted at the extreme points of travel of the worm gear sector 6 so as to periodically reposition the camera to look ahead of the vehicle, as from point 10 of FIG. 2, with this repositioning being effected each time the vehicle reaches point 11 of FIG. 2, whereby the operation in the manner described is periodically repeated each time the aircraft moves the distance between points 10 and 11. Thus, a "leap-frogging" operation is achieved. It is, of course, possible to move the camera 2 with a fast return motion, as will be readily understood by one skilled in the art, when the limit switch 13 is engaged by the worm sector 6 followed by the slow, controlled tilting action after limit switch 12 is engaged, and under the action of control 9 and servo motor 8.

It should be understood in the operation of apparatus of the type described in conjunction with FIG. 1 that the aircraft 1 is normally provided with an automatic pilot which keeps the aircraft substantially on course and at a constant height above sea level. It should also be understood that although the apparatus has been particularly described in conjunction with aircraft, at least certain of the principles of the invention can be adapted to operations with surface or underwater ships and with the optical system described being replaced with sonar, radar, or similar other wave type terrain viewing mechanism. It may be noted, further, that the camera 2 can operate on electric magnetic waves of any wavelengths such as visible, infra-red and ultra-violet. The camera also may be controlled by tuning means associated with the control 9 to actuate the camera for obtaining a picture or series of pictures of the particular area 17 viewed by operation of the camera shutter and in particular for obtaining stereoscopic type picture sequences of the terrain such that timing is controlled to provide any desired percentage of image overlap between successive pictures.

Figure 3:
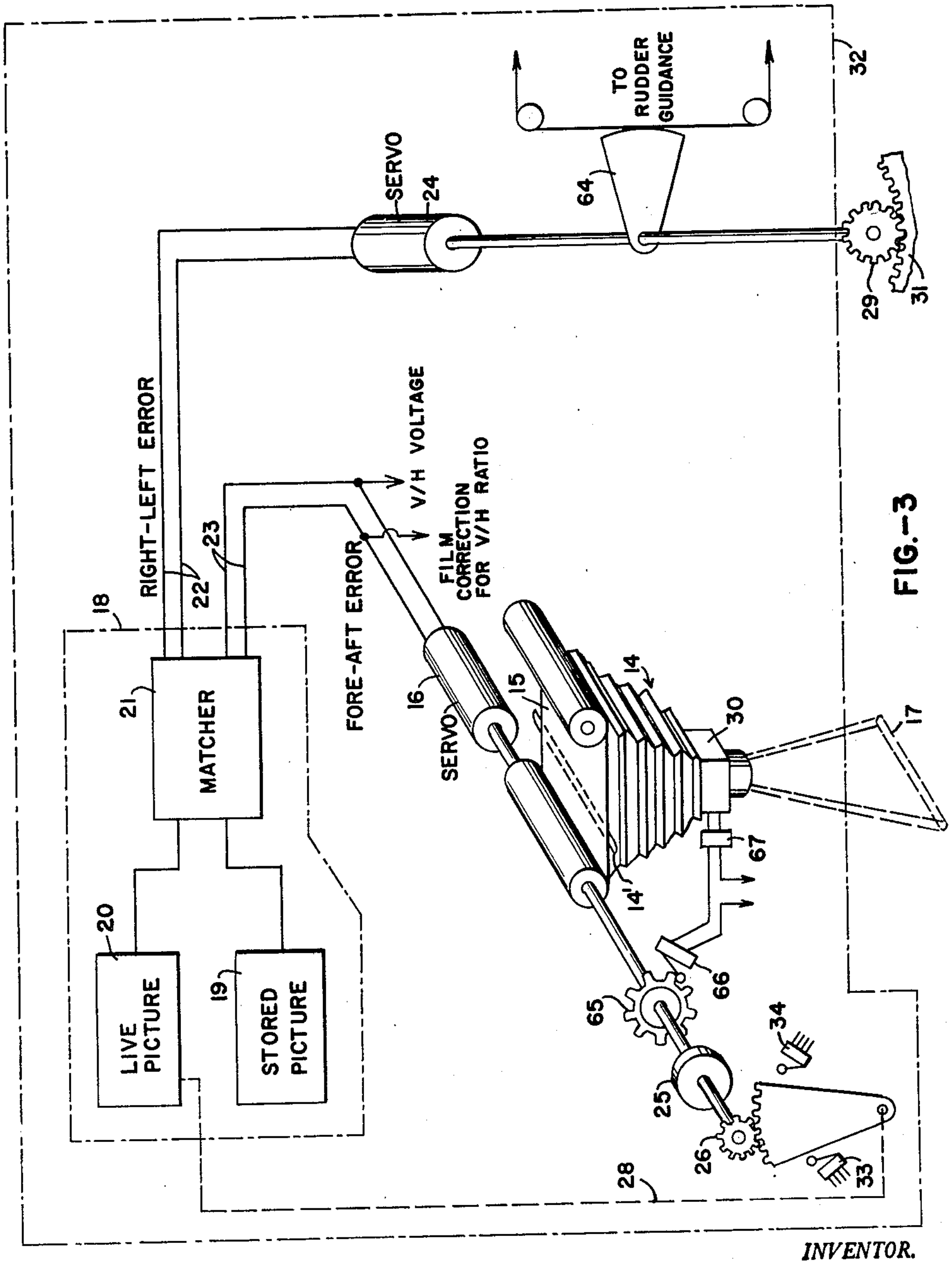
FIG. 3 is a diagrammatic view of a modification of the apparatus of the invention wherein the film of the camera is controlled rather than the entire camera in order to effect the compensation desired for vehicle forward velocity, and with the figure of the drawing showing in box diagram form the matching technique utilized for control purposes.

Turning now to the more refined embodiment of the invention illustrated in FIG. 3, the numeral 14 indicates generally an aerial camera carried in an aircraft, not shown specifically, and mounted on a platform 32 for rotation about a vertical axis. The camera has an aperture plate 14′ such that the image formed by lens 30 and being recorded on the film at any time consists of a narrow strip 17 of terrain directly below the aircraft and substantially perpendicular to the direction of aircraft motion. During operation the camera shutter is left open and the film 15 is advanced by the servo 16 in such a manner that the forward motion of the film compensates for the forward speed of the aircraft and its height above the terrain. Thus, a continuous picture of the terrain passing under the aircraft is obtained, furthermore during the time that a particular point on the film passes over the aperture it is moving at the same speed as the terrain image being recorded thereon so that any blur or smear of the image is prevented.

The mechanism for controlling the operation of the servo motor 16 comprises a control indicated in general by the numeral 18 also mounted on platform 32, this control including means 19 for storing a picture or electrical information taken from a picture of the terrain area 17 over which the aircraft is passing. A typical storage means may comprise a type QK–464 electronic storage tube manufactured by Raytheon Manufacturing Company. The control mechanism 18 also includes image sensor means 20 for producing a live or substantially instantaneous picture or electrical information from a picture of the terrain over which the aircraft is passing. The picture stored in the means 19 and the picture produced by the means 20 are to substantially the same scale and orientation and may be produced by means shown in FIG. 4.

Now in order to effect the control function of the mechanism 18 the stored picture or picture information of means 19 is continuously compared with the picture or received information of means 20, and this can be accomplished by specific mechanism of the character disclosed and claimed in pending application Serial No. 843,034, filed September 24, 1959, and/or by application Serial No. 757,651, filed August 25, 1958. Suffice it to say here that the comparison of the stored reference means 19 and the live or instantaneous reference means 20 is effected by a matcher 21 which as described in the identified patent application includes means for effecting nutation or matching movement between the stored and the instantaneous reference information, such movement being associated with a phase discriminator means showing that the matching operation occurs in a particular quadrant and producing right-left error voltages and/or fore-aft error voltages. Such error voltages are transmitted, respectively, by electric leads 22 and 23 to servo motor 24 and 16, respectively.

The function of the servo motor 16 to advance the camera film 15 has already been described. The servo motor 16 may also serve to drive through an overrunning clutch 25 a gear 26 which operates an arcuate rack 27 tied back through a connection 28 to reposition the live or instantaneous picture means 20 in a fore and aft direction with respect to the stored picture means 19. Thus, as the aircraft moves forward along its course and such movement tends to misalign the stored picture means 19 and the live picture means 20 in a fore and aft direction the matching and corrective mechanism described tends to constantly reposition the stored and the live picture means in a fore and aft direction and concurrently advances the camera film 15 so that the film is alway looking at the same area 17 of the terrain over which the aircraft is passing. Thus, by the mechanism described image motion correction is effected in the camera and blurring of pictures taken is avoided.

As has been stated, the control mechanism 18 also produces a right-left error voltage, this being an indication of the camera drift angle, and such error voltage operating through servo motor 24 can be utilized to drive a gear 29 engaging with an arcuate gear sector 31 affixed to the airframe so as to rotate the platform to correct the drift angle and assure that the direction of film motion is in proper alignment with the direction of aircraft motion. This serves to eliminate any blurring or image motion resulting from yaw or side slip of the aircraft. The position of the shaft and gear 29 will then give an indication of the yaw angle of the aircraft. The yaw angle indication obtained from the shaft position may be employed for producing a vehicle attitude control signal. This is particularly useful with a satellite utilizing a horizon scanner for altitude control since a horizon scanner gives roll and pitch indications but not yaw. Any suitable amplifying means can be incorporated in the arrangement of mechanism to effect the mechanical force required to perform the operation described. Finally, the right-left error signal can be used to reposition the electronically live and the stored reference information in a lateral direction.

Since the live picture 20, and the stored picture 19 are both received from the same source, namely, the camera 14, and since both are substantially the same area of terrain 17, the movement of the film strip 14' is a measure of the angular movement which the camera 14 would have had to make to compensate for the forward movement of the aircraft. Therefore, it will be recognized that in the operation of the apparatus diagrammatically illustrated in FIG. 3 that the fore-aft error voltage is a function of the forward velocity of the aircraft and because of the measured movement of the film strip 14 its height above the terrain, the particular function being V/H, and that this information can be utilized in any manner desired and to perform other functions than the control of camera or film movement during the taking of aerial photographs.

The apparatus of FIG. 3 likewise adapts itself to a repetitive or "leap-frogging" operation for image sensor means 19 and 20, this being accomplished, for example, by providing a pair of limit switches 33 and 34 engaging with the edges of the arcuate rack 27 at limited extents of the movement thereof, the limit switch 33, for example, returning the rack 27 to its initial position, overrunning clutch 25 permitting this, and with limit switch 34 then initiating the normal operation of the apparatus. Immediately after such repositioning movement the stored picture or reference information at means 19 will be replaced with a new stored picture or reference information of a new area of the terrain, and the apparatus will be reconditioned to perform another operating cycle as already described. This operative cycle will be continuously repeated in "leap-frogging" fashion as the aircraft moves down or along a given path or course, and with the system functioning effectively regardless of changes of aircraft speed or changes of aircraft height during or between each repetitive cycle all as more particularly described in application Serial No. 757,651, supra.

Figure 4:
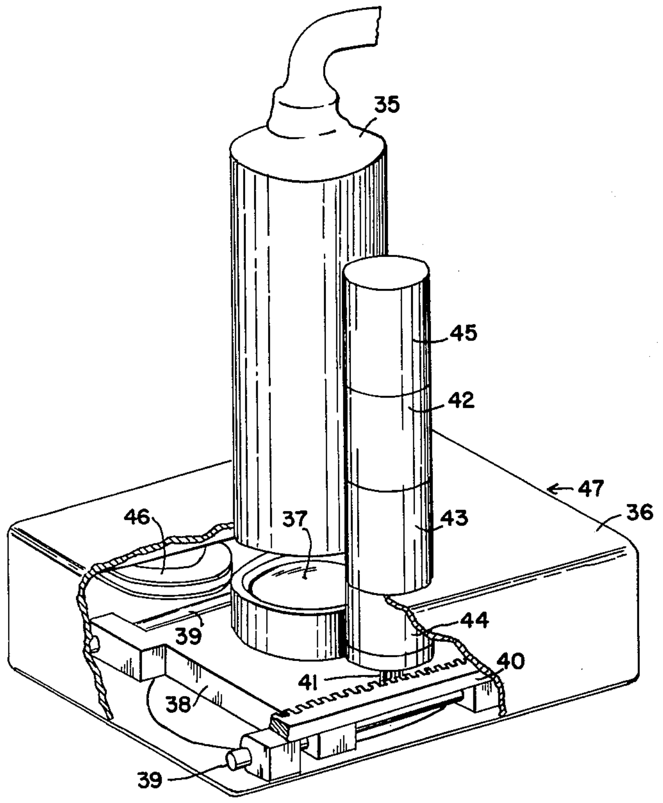
FIG. 4 is a perspective view, partially broken away, of more specific apparatus for performing the function of the invention.

Coming now to the still more complete implementation of an operating system of the invention, FIG. 4 illustrates an assembly of parts including an image pick-up tube as of the vidicon type 35, this, for example, being of type No. 6198, manufactured by Radio Corporation of America. The vidicon 35 is carried on a case 36 above a lens assembly 37 carried on a slide 38 mounted for sliding movement on rods 39 held in the case 36, and with the lens 37 and slide 38 being adapted to be moved in the direction of flight of the aircraft and at right angles to the axis of the vidicon 35 by a rack 40 secured to the slide and driven by a gear 41. The gear 41 is driven by a servo motor 42 operating through a reduction gear 43 and a clutch 44. A tachometer 45 may likewise be associated with the assembly in known manner to better indicate and control the speed of motor 42.

The apparatus of FIG. 4 may likewise include a spring 46 for returning the slide 38 and lens assembly 37 to an initial position when the clutch 44 is released, thereby providing for the "leap-frogging" operation already described in conjunction with FIG. 3.

Figure 5:
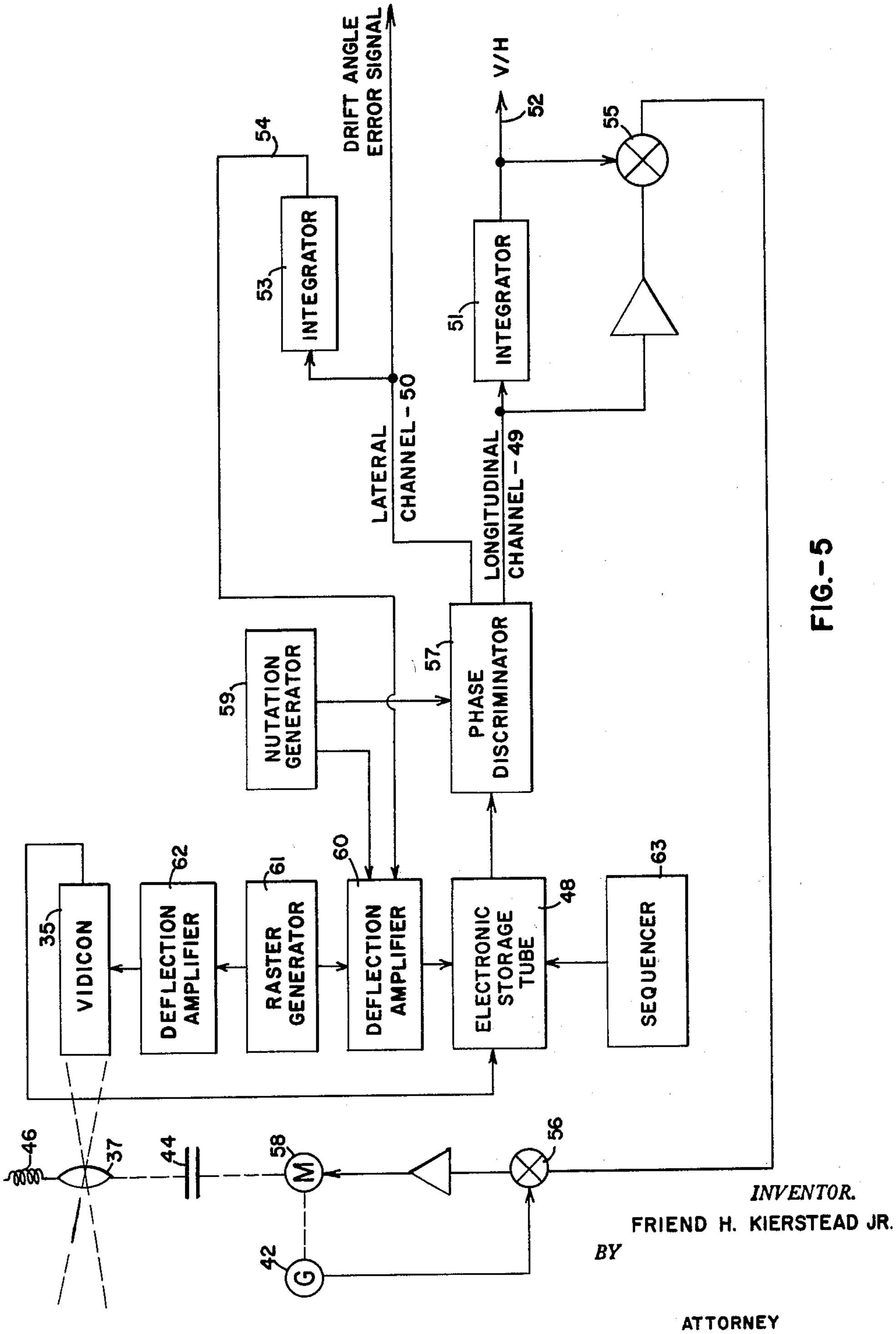
FIG. 5 is a box diagram of the circuitry of the apparatus of the invention.

The apparatus of FIG. 4, and indicated as a whole by the numeral 47, is adapted to be electrically connected in the manner shown in FIG. 5. The vidicon 35, supplied with deflection voltages from raster generator 61 through deflection amplifier 62, is connected to a storage tube 48 which performs the function of storing a reference picture or information of the terrain and which in connection with nutation generator 59, phase discriminator 57, and deflection amplifier 60, compares this stored information with information continuously supplied from the terrain through the vidicon 35 to produce fore-aft and right-left error information passing to a longitudinal channel 49 and a lateral channel 50 respectively. The longitudinal channel information is integrated by the integrator 51 to produce a V/H signal or voltage which can be utilized for any purpose desired, this V/H signal output being indicated by numeral 52. The V/H signal is applied to the servo motor 42 to drive the lens assembly 37 in order to continuously reposition the vidicon image in longitudinal match with the image stored in the electronic storage tube 48. The longitudinal signal or voltage suitably amplified is added to the V/H signal by summing means 55 to improve the stability of the servo loop and to provide quicker response at the start of operations. The output of tachometer generator 58 is added to the motor input voltage through summing means 56 for more accurate control of the motor speed in response to the output voltage from summing means 55.

In a similar manner the lateral channel 50 output provides a drift angle error signal which may be used as shown and described in FIG. 3 to rotate the platform 32 and correct for yaw. The lateral channel signal is also integrated in integrator 53 to produce a signal or voltage 54 which may be applied through deflection amplifier 60 to continuously reestablish lateral match between the vidicon image and the stored image.

The sequencer 63 diagrammatically represents the switching and timing control operations for the system, for example the switching to initiate return of lens 37 to its starting position, to initiate the storage of a new image in the electronic storage tube, to initiate the matching or correlating operation and all such switching as is required to provide for the automatic repetitive operations.

In normal operation, the scene, as viewed by the vidicon 35 is transferred to the storage tube 48 by conventional television techniques by scanning both units synchronously with the raster generator 61 through deflection amplifiers 60 and 62 and modulating the read-in beam of the storage tube with the output of the vidicon. Once the scene is stored on the storage tube, the potentials within the storage tube are adjusted for normal read-out operation. Correlation, as indicated, is performed by again scanning both the vidicon 35 and the storage tube 48 under the control of the raster generator 61 but this time modulating the read-out beam of the storage tube with the output of the vidicon. During correlation, the vidicon image is continuously and repetitively moved relative to the storage tube display by applying additional deflection voltages (for nutation, as an example) to the storage tube through deflection amplifier 60 to effect the matching, i.e. correlating action. The output of the storage tube during the above-mentioned process is employed as a measure of the extent of match or correlation between the two displays.

More specifically, the output is the product of the two display functions since the requirement for a signal appearing at the output signal electrode of each of the vidicon and the storage tube is (1) that there is a beam current due to a target area seen or sensed by the vidicon and (2) that the corresponding scanning beam in the storage tube beam impinges on a target area (i.e. the same target area) in the storage grid which permits electron passage. In the case stated, a maximum output signal occurs at best match or correlation of the respective target areas, this condition of best match being achieved by seeking a match between the respective target areas, as by nutating the areas with respect to each other by nutation generator 59 as aforesaid.

It can be seen further, that if a negative scene or image of the target area is stored (by proper adjustment of the storage tube potentials in a manner familiar to one skilled in the art) a minimum signal output of the storage tube and vidicon occurs at the point of best match or correlation of the target areas. These two techniques are described as product and quotient match respectively.

It will be understood that error signals are generated in the output of the storage tube as a function of the distance and quadrant, i.e. direction, of the nutating movement necessary to effect a match all as achieved by nutating the vidicon image relative to the stored image by means of nutation generator 59 and deflection amplifier 60.

The error signals are separated in phase discriminator 57 into lateral, i.e. right-left, and longitudinal, i.e. fore-aft error signals in the manner described and which will be understood by the man skilled in the art, or as set forth in copending application Serial No. 76,152, filed February 12, 1949, and entitled "Electronic Map Matching Apparatus."

Referring back to FIG. 3, it is to be noted that if the apparatus of the invention is to be utilized to automatically guide or correct the guidance of a vehicle or aircraft in right-left or lateral direction that servo 24 can be used to move an arcuate sector 64 controlling a rudder or other guidance mechanism.

Also in FIG. 3, in variation of the system previously described, the servo 16 may be utilized to drive a readily replaceable cam 65 having a selected number of teeth thereon for individually tripping a switch 66 controlling a solenoid 67 for tripping the shutter of camera lens 30 each time the film 15 has been advanced to a new position in relation to the slot 14'. By changing the cam 65 to one having a greater or less spacing between the teeth the amount of overlap of the repeated pictures taken through slot 14' can be adjusted for use in a system where the camera continually views a particular area from a plurality of given angles close to the vertical and for also moving the film as heretofore described.

It will be understood from the foregoing description that the apparatus of the invention can be utilized as a V/H computer, the computer producing a voltage which is a function of the indicated relation of vehicle velocity and height. The apparatus can be specifically utilized to prevent the blurring of photographs taken from relatively high speed aircraft, space vehicles and the like and under adverse light conditions so that longer shutter openings are required, all without the motion of the vehicle blurring the pictures produced. Moreover, the apparatus of the invention can be utilized as a guidance system of high accuracy, particularly when employed in conjunction with optical means for taking the stored picture and for producing the continuous or live picture or reference information. Yaw deviations of the aircraft or satellite can be corrected in the manner described and with the "leap-frogging" or "boot strap" repetitive cycling of the apparatus. It will be understood that in the preferred embodiment of the invention the optical electronic V/H computer means of the invention will be utilized in an arrangement separate from the camera, as in the form of the invention shown in FIGS. 4 and 5, for importantly including the systems of continuous camera operations and film speed control in viewing at all times a wide area of the terrain over which the aircraft or vehicle is passing. In such systems, the V/H computer means is utilized in conjunction with the camera itself for image motion control of the camera for any fore or aft and left to right error that might cause blur or smearing of the picture.

The V/H computer of the invention itself utilizes an optical-electronic image sensor and electronic means for the automatic and repeated comparison and correlation of images that cover very large two dimensional areas and affording a correspondingly large detail of information that serves as a basis for the highly efficient computer operation as employed in conjunction with the image motion control of the continuous camera operations over a very wide range of operating conditions.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a vehicle of apparatus for producing a voltage proportional to the forward velocity of the vehicle divided by the height of the vehicle above the terrain over which it is passing and including means for producing in the vehicle information of a specific area of the terrain over which the vehicle is passing, means for storing an initial image of said information to provide reference information, means for continuously changing the means for producing information as the vehicle continues in its movement so that the specific area of terrain viewed is substantially the same as was viewed when the information was stored, means for comparing said reference information with the continuously produced information, means responsive to the means for changing the specific area of terrain viewed to produce a voltage which is a function of vehicle velocity divided by vehicle height above the terrain, and means for effecting an automatic and repetitive operation of the recited means as the vehicle continues in its movement.

2. The combination in a vehicle of apparatus for producing a voltage proportional to the forward velocity of the vehicle divided by the height of the vehicle above the terrain over which it is passing and including means for producing in the vehicle information of an area of the terrain over which the vehicle is passing, means for storing an initial image of said information to provide reference information, means for changing the means for producing information as the vehicle continues in its movement so that the terrain area viewed is substantially the same as was viewed when the information was stored, means for comparing said reference information with the information produced by changing the producing means, and means responsive to the means for changing the terrain area viewed to produce a voltage which is a function of vehicle velocity divided by vehicle height above the terrain.

3. Apparatus for prevention of picture blurring in aerial photography comprising, a vehicle including an aerial camera, mechanism for producing a voltage proportional to the forward velocity of the vehicle divided by the height of the vehicle above the terrain over which it is passing and including means for substantially continuously producing in the vehicle information of an area of the terrain over which the vehicle is passing, means for storing an initial image of said information to provide reference information, means for comparing said reference information with the continuously produced information, means operated by the comparing means for changing the terrain area viewed by the means for substantially continuously producing information so that the terrain area viewed is substantially the same as was viewed when the information was stored, means responsive to the means for changing the terrain area viewed to produce a voltage which is a function of vehicle velocity divided by vehicle height above the terrain, means for effecting an automatic and repetitive operation of the recited means as the vehicle continues in its movement, and means operated by the comparing means including camera image motion compensation means for control of the camera operation.

4. The combination comprising, an aircraft, a camera carried by the aircraft for taking pictures of the terrain relative to which the aircraft is moving, means operative when the camera is in operation for the maintenance of the camera image of the terrain viewed, and said means including image motion compensation means to prevent movement in a fore-aft direction of the terrain image with respect to the film, and drift angle image motion compensation means to prevent lateral movement of the image of the terrain viewed by the camera as a result of yaw of the aircraft, and means for automatically "leap-frogging" the camera ahead to view another section of the terrain and for then repeating the operation of the aforesaid means.

5. A camera control system comprising, a vehicle, a camera having control means, means for producing and storing a first electronic image signal representative of the terrain as viewed by the camera and including optical means for tracking the camera viewed terrain for producing an additional electronic image signal representative of the same area of the camera viewed terrain, means for comparing and correlating the said signals and computing a signal representing the V/H ratio thereby and means including the computed ratio signal for the image motion compensation of said camera by said control means.

6. Apparatus comprising tracking means for an object with respect to the terrain over which it passes, optical-electronic means including means for viewing and storing an image along said track and means for viewing a corresponding image along said track, means for comparing the stored and corresponding images, measuring and correlating means indicative of displacement of the time delayed stored image with respect to the corresponding image and means for computing the velocity to height ratio with the information received from the measuring and correlating means and the speed of the object with respect to the terrain over which it passes.

7. Apparatus comprising tracking means for an object with respect to the terrain over which it passes, optical-electronic means including means for viewing and storing an image along said track and means for viewing a corresponding image along said track, means for comparing the stored and corresponding images, measuring means indicative of displacement of the time delayed stored image with respect to the corresponding image, and means responsive to the measuring means for returning the object to the desired directional track.

8. Optical-electronic apparatus comprising tracking means for an object with respect to the terrain over which it passes, which includes means for viewing and storing an image along said track and means for viewing a corresponding image along said track, means for comparing the stored and corresponding images, measuring means indicative of displacement of the time delayed stored image with respect to the corresponding image, means for computing the velocity to height ratio from the information received from said measuring means and the speed of the object with respect to the terrain over which it passes, optical-electronic means including a vidicon type camera means and electronic storage tube, means operative to maintain the image area being viewed for image comparison purposes over a period of relative movement of the object and terrain and means for the automatic repeated image formation and comparison operations.

9. Apparatus comprising tracking means for an object with respect to the terrain over which it passes, optical-electronic means including means for viewing and storing an image along said track and means for viewing a corresponding image along said track, means for comparing the stored and corresponding images, measuring means indicative of displacement of the time delayed stored image with respect to the corresponding image, means for computing the velocity to height ratio from the information received from the measuring means and the speed of the object with respect to the terrain over which it passes, means for the automatic and continuous operation of the computer, a camera and means including the computer and shutter timing means for providing for image motion compensation for control of the operation of the camera.

10. In an apparatus for prevention of picture blurring in aerial photography from an aircraft the combination of,
- an aerial camera mounted in the aircraft,
- means for producing in the camera information of an area of the terrain over which the aircraft is passing,
- means for storing an initial view of said information to provide reference information,
- means for continuously changing the means for producing information as the aircraft continues in its movement so that the terrain area viewed is continuously substantially the same as it was viewed when the information was stored,
- means for comparing said reference information with the information produced by the means for continuously changing the terrain area viewed,
- means responsive to the comparing means to produce a voltage which is a function of vehicle velocity divided by vehicle height above the terrain, and
- an image motion compensation means operated by the comparing means for controlling the camera.

11. In combination,
- an aircraft,
- a camera carried by the aircraft and adapted to take pictures therefrom of terrain relative to which the aircraft is moving,
- means for producing and storing a first electronic image signal representative of a specific section of the terrain as viewed by the camera,
- means at least operative when the shutter of the camera is open causing the terrain image on the film of the camera to have no movement thereon regardless of the height or forward motion of the aircraft,
- means for continuously producing after a time interval an additional electronic image signal representative of the same area as said first stored electronic image signal representative of the specific area of the terrain,
- means for comparing and correlating the said signals to compute a signal representing the V/H ratio of the aircraft,
- control means for the camera, and
- means adapted to utilize the computed V/H ratio to achieve image motion compensation of said camera by said control means.

References Cited by the Examiner

UNITED STATES PATENTS

| | | | |
|---|---|---|---|
| 2,526,682 | 10/50 | Mulberger et al. | |
| 2,929,305 | 3/60 | Blackstone | 95—12.5 |
| 2,961,877 | 11/60 | Edwards | 74—5.22 |
| 2,972,928 | 2/61 | Maurer | 95—12.5 |
| 3,006,235 | 10/61 | Brandon | 95—12.5 |
| 3,103,008 | 9/63 | Mooney | 343—7 X |

OTHER REFERENCES

Klass: "Optical Guidance Designed For Missiles," Aviation Week, December 8, 1958, pages 67, 69, 71.

NORTON ANSHER, *Primary Examiner.*

C. L. JUSTUS, JOHN M. HORAN, *Examiners.*